US009332166B2

(12) United States Patent
Kawakami et al.

(10) Patent No.: US 9,332,166 B2
(45) Date of Patent: May 3, 2016

(54) IMAGING APPARATUS EQUIPPED WITH ILLUMINATION OPTICAL SYSTEM HAVING A PLURALITY OF OPTICAL INTEGRATORS THAT GUIDE LIGHT

(75) Inventors: Tomoaki Kawakami, Utsunomiya (JP); Toshihiko Tsuji, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 13/821,490

(22) PCT Filed: Sep. 6, 2011

(86) PCT No.: PCT/JP2011/070682
§ 371 (c)(1),
(2), (4) Date: Mar. 7, 2013

(87) PCT Pub. No.: WO2012/033219
PCT Pub. Date: Mar. 15, 2012

(65) Prior Publication Data
US 2013/0169859 A1 Jul. 4, 2013

(30) Foreign Application Priority Data

Sep. 10, 2010 (JP) ................................. 2010-203158
Jun. 20, 2011 (JP) ................................. 2011-136534

(51) Int. Cl.
*G02B 6/42* (2006.01)
*H04N 9/31* (2006.01)
*H04N 5/225* (2006.01)
*G02B 27/09* (2006.01)

(52) U.S. Cl.
CPC .......... *H04N 5/2256* (2013.01); *G02B 27/0994* (2013.01)

(58) Field of Classification Search
CPC ..................................................... G02B 27/04
USPC ............................... 348/294; 362/244; 355/53
See application file for complete search history.

(56) References Cited

U.S. PATENT DOCUMENTS

| 7,136,157 B2 * | 11/2006 | Gomm et al. ............... 356/237.1 |
| 7,564,019 B2 * | 7/2009 | Olsen et al. ................. 250/208.1 |
| 2002/0126479 A1 * | 9/2002 | Zhai et al. ...................... 362/244 |
| 2012/0262686 A1 * | 10/2012 | Laidig .............................. 355/53 |

FOREIGN PATENT DOCUMENTS

| CN | 1517785 A | 8/2004 |
| CN | 1655064 A | 8/2005 |
| JP | 2006064380 A | 3/2006 |
| JP | 2008510201 A | 4/2008 |

(Continued)

*Primary Examiner* — Joel Fosselman
(74) *Attorney, Agent, or Firm* — Canon USA Inc., IP Division

(57) ABSTRACT

An imaging apparatus (1) includes an illumination optical system (100) that includes a light source (110) and is configured to guide light from the light source to a target(B), an imaging optical system configured to capture an image of the target, and a plurality of image sensors (430) arranged on an image plane of the imaging optical system. The illumination optical system includes a plurality of integrators (121,122). Light flux exits from one of the plurality of integrators illuminates at least one of the plurality of image sensors, and light exits from the other integrators illuminates at least one of the plurality of image sensors other than the image sensor illuminated by the light exits from the one of the plurality of integrators.

13 Claims, 35 Drawing Sheets

(56) References Cited

FOREIGN PATENT DOCUMENTS

| | | |
|---|---|---|
| JP | 2008210814 A | 9/2008 |
| JP | 2009003016 A | 1/2009 |
| JP | 2009063665 A | 3/2009 |
| JP | 2009069691 A | 4/2009 |
| JP | 2009-276544 A | 11/2009 |
| JP | 2009276554 A | 11/2009 |
| WO | 2008047893 A | 4/2008 |

* cited by examiner

122

122

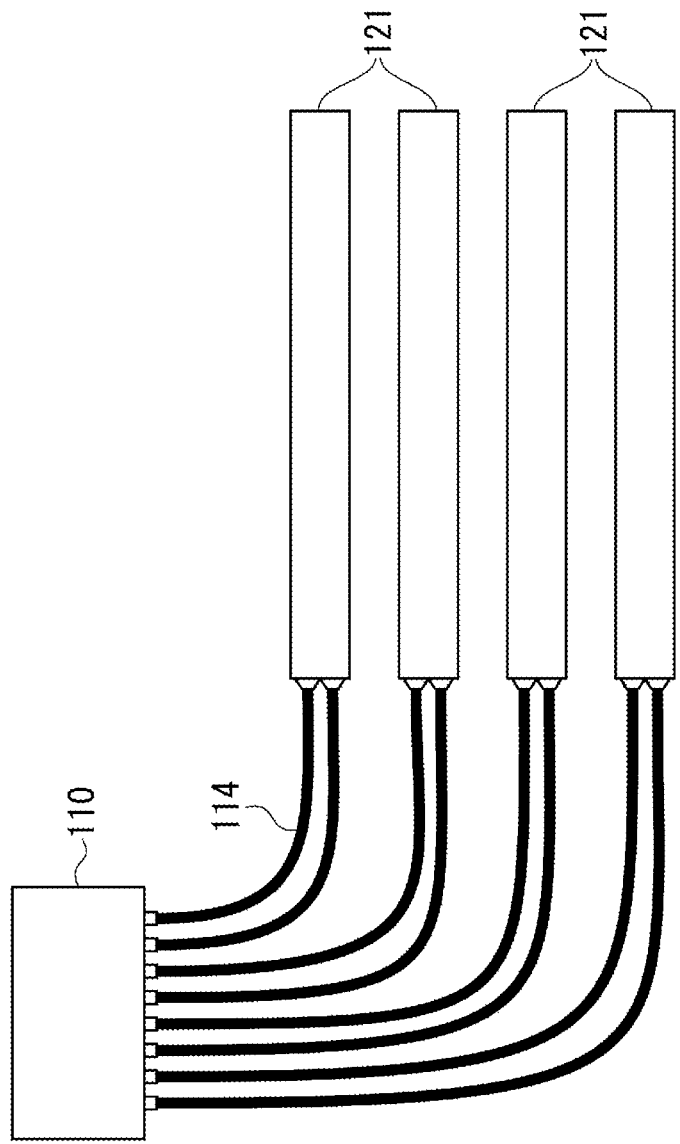

IMAGING APPARATUS EQUIPPED WITH ILLUMINATION OPTICAL SYSTEM HAVING A PLURALITY OF OPTICAL INTEGRATORS THAT GUIDE LIGHT

TECHNICAL FIELD

The present invention relates to a structure of an imaging apparatus that uses a plurality of image sensors to capture images of a sample.

BACKGROUND ART

In recent years, imaging apparatuses have drawn attention to their ability to pickup information from overall sample to cell tissues as electronic images and display the images on a monitor.

For example, Japanese Translation of PCT International Application Publication No. 2008-510201 discusses a method of forming an image of a sample as a whole by connecting images of the sample that are captured at high resolution and high magnification. However, the method involves many times of image capturing to obtain an overall image of one sample, so that it is time-consuming. Japanese Patent Application Laid-Open No. 2009-003016 and Japanese Patent Application Laid-Open No. 2009-063665 each discuss a method of forming an image of a sample by capturing images of the sample at high speed and high magnification by an objective lens having a large field range and high resolution and a plurality of image sensors.

FIGS. 2A and 2B illustrate an example using a plurality of image sensors: FIG. 2A illustrates an object to be imaged; and FIG. 2B illustrates an imaging unit of an imaging apparatus. In FIG. 2A, a sample 225 as the object to be imaged is placed on a sample holding unit 220 (e.g., glass slide) within an illuminated area 228. In FIG. 2B, an image of the illumination area 228 is formed within an image-forming area 228c, and an image 225C of the object to be imaged lies on an electric substrate 420 having image sensors 430. As illustrated in FIG. 2A, light illuminates the sample (within the illumination area 228), so that an image of the sample is formed on the electric substrate 420 having the plurality of image sensors 430 (within the illumination area 228c).

It is difficult to arrange the plurality of image sensors 430 without space therebetween because of wiring, so that there is space between the image sensors. Thus, the sample or the imaging unit is driven to be displaced a plurality of times, so that an image of the sample is captured at every displaced position. The plurality of the captured image is combined to form an overall image to acquire the outer profile information of the entire sample. In this acquisition, a plurality of image sensors is used because it is extremely difficult to prepare image sensor large enough to be capable of capturing an image of a large area collectively.

In the case where a plurality of image sensors is used, when a sample is illuminated entirely and symmetrically along an optical axis as illustrates in FIG. 2A, an image is formed on an image plane as illustrated in FIG. 2B, the image extending between and outside of the image sensors. The light used to form the image parts between and outside of the image sensors is reflected by the electric substrate and machine units outside of the substrate, and hits the other electric substrates, machine units, and lenses of the imaging optical system. Consequently, the light may enter the image sensors as undesirable light such as flare for the image capturing, which may lead to degradation of image quality.

The light illuminated between and outside of the image sensors, if not reflected, is absorbed into the electric substrate as heat. The image sensors have properties that vary depending on heat, and thereby the heat may degrade the image quality.

CITATION LIST

Patent Literature

Japanese Translation of PCT International Application Publication No. 2008-510201
Japanese Patent Application Laid-Open No. 2009-003016
Japanese Patent Application Laid-Open No. 2009-063665

SUMMARY OF INVENTION

The present invention is directed to providing an imaging apparatus having a plurality of image sensors that prevents degradation in image quality due to light illuminating a part other than the image sensors.

According to an aspect of the present invention, an imaging apparatus is provided, the apparatus including an illumination optical system that includes a light source and is configured to guide light from the light source to a target, an imaging optical system configured to capture an image of the target, and a plurality of image sensors arranged on an image plane of the imaging optical system. The illumination optical system includes a plurality of integrators. Light flux exits from one of the plurality of integrators illuminates at least one of the plurality of image sensors, and light exits from the other integrators illuminates at least one of the plurality of image sensors image sensor illuminated by the light exits from the one of the plurality of integrators.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 17 illustrates a light source unit having a plurality of light source channels.

DESCRIPTION OF EMBODIMENTS

Various exemplary embodiments, features, and aspects of the invention will be described in detail below with reference to the drawings.

Figure 1:
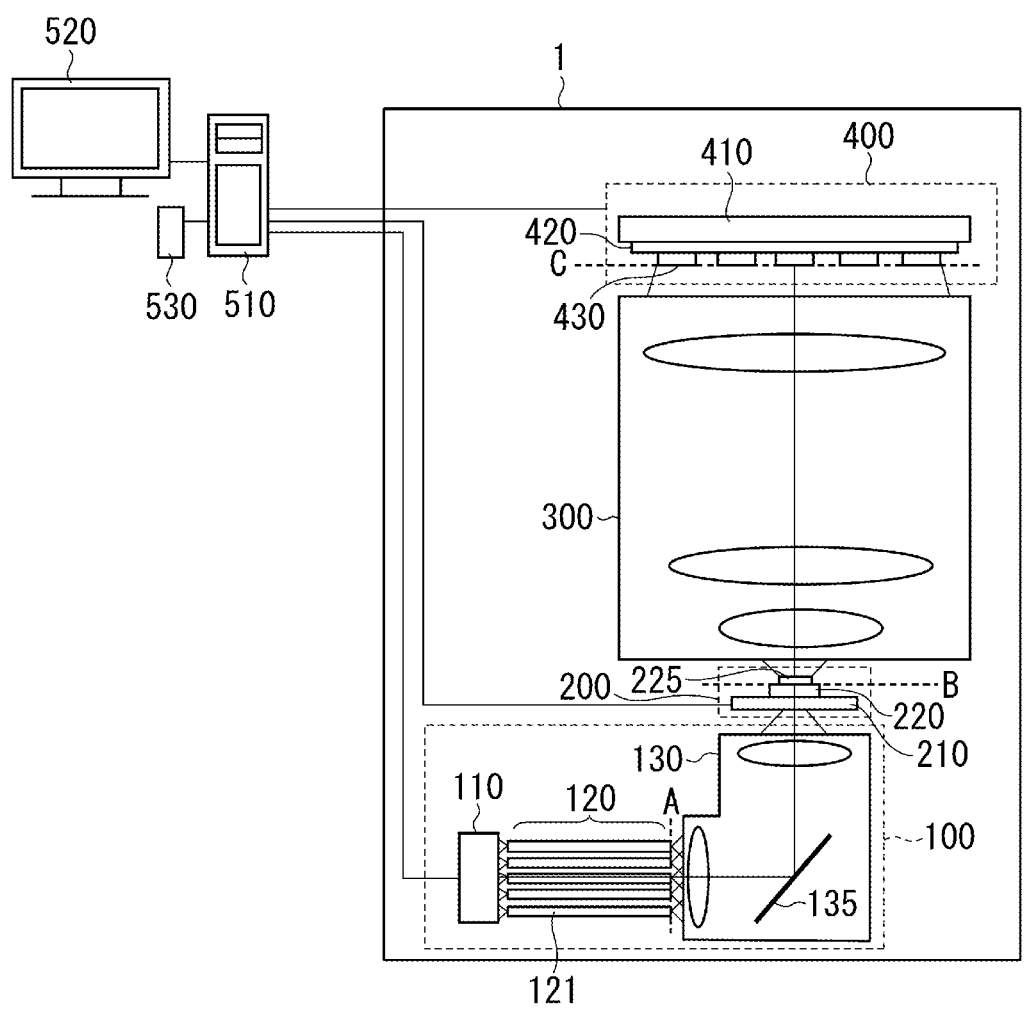
FIG. 1 illustrates an entire imaging apparatus according to the present invention.

A first exemplary embodiment is described. FIG. 1 schematically illustrates an imaging apparatus according to the present exemplary embodiment. In FIG. 1, an imaging apparatus 1 includes an illumination optical system 100 having a light source unit 110, and a sample unit 200. The illumination optical system 100 guides light fluxes from the light source unit 110 to a target B to be illuminated where an object to be imaged 225 is disposed. The imaging apparatus 1 further includes an imaging optical system 300 to form an image of the object disposed on a target, and an image sensor unit (imaging unit) 400 including a plurality of image sensors 430 arranged on an image plane of the imaging optical system 300.

The illumination optical system 100 is composed of the light source unit 110, an optical integrator unit 120 having a plurality of optical rods 121 (including a first integrator and a second integrator), and a conjugate optical system 130 including a mirror 135 and lenses. The light source unit 110 emits light fluxes to illuminate a sample at the sample unit 200, and may include one or a plurality of halogen lamps, xenon lamps, and light emitting diodes (LEDs).

Figure 3:
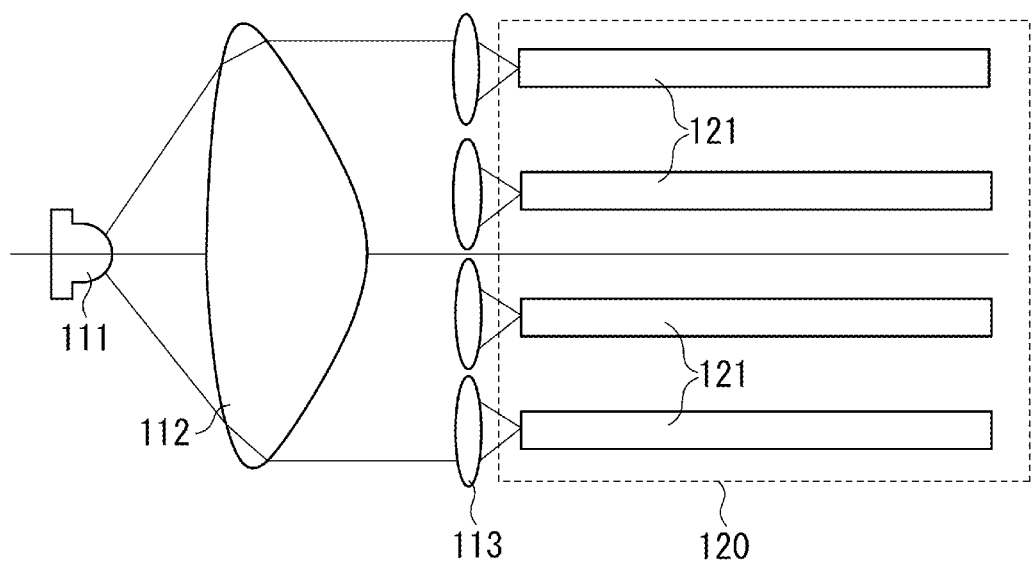
FIG. 3 illustrates an optical integrator unit.
Figure 4:
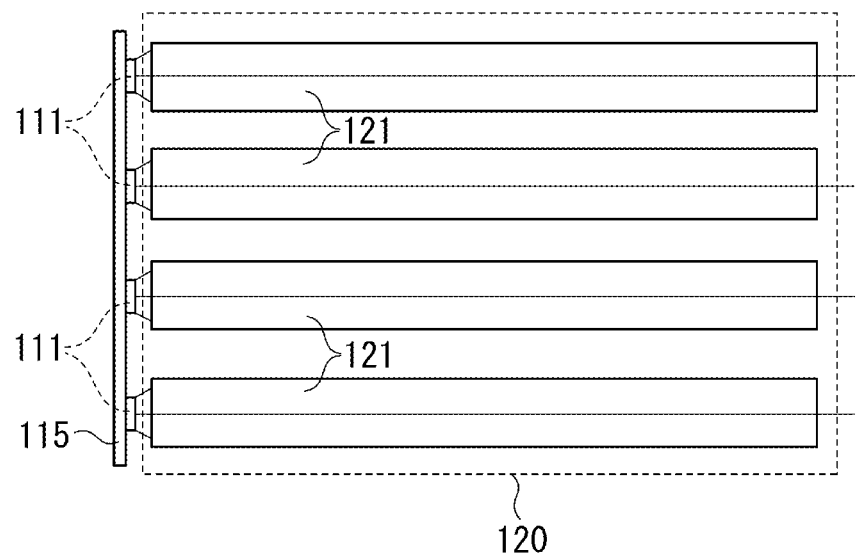
FIG. 4 illustrates an optical integrator unit.

The light source unit 110 provides light only to the plurality of optical rods 121. For example, as illustrated in FIG. 3, in the light source unit 110, diverging light emitted from a light source 111 are collimated by a collimating lens 112. The light flux is collected to desired positions and at a desired angle using a lens array 113. Alternatively, as illustrated in FIG. 4, a plurality of light sources 111 may be disposed on an electric substrate 115 so that light fluxes emitted from the light sources 111 each enter a corresponding optical rod disposed downstream of the light sources 111. Collective lenses may be placed between the plurality of light sources 111 and each optical rods 121.

Figure 5:
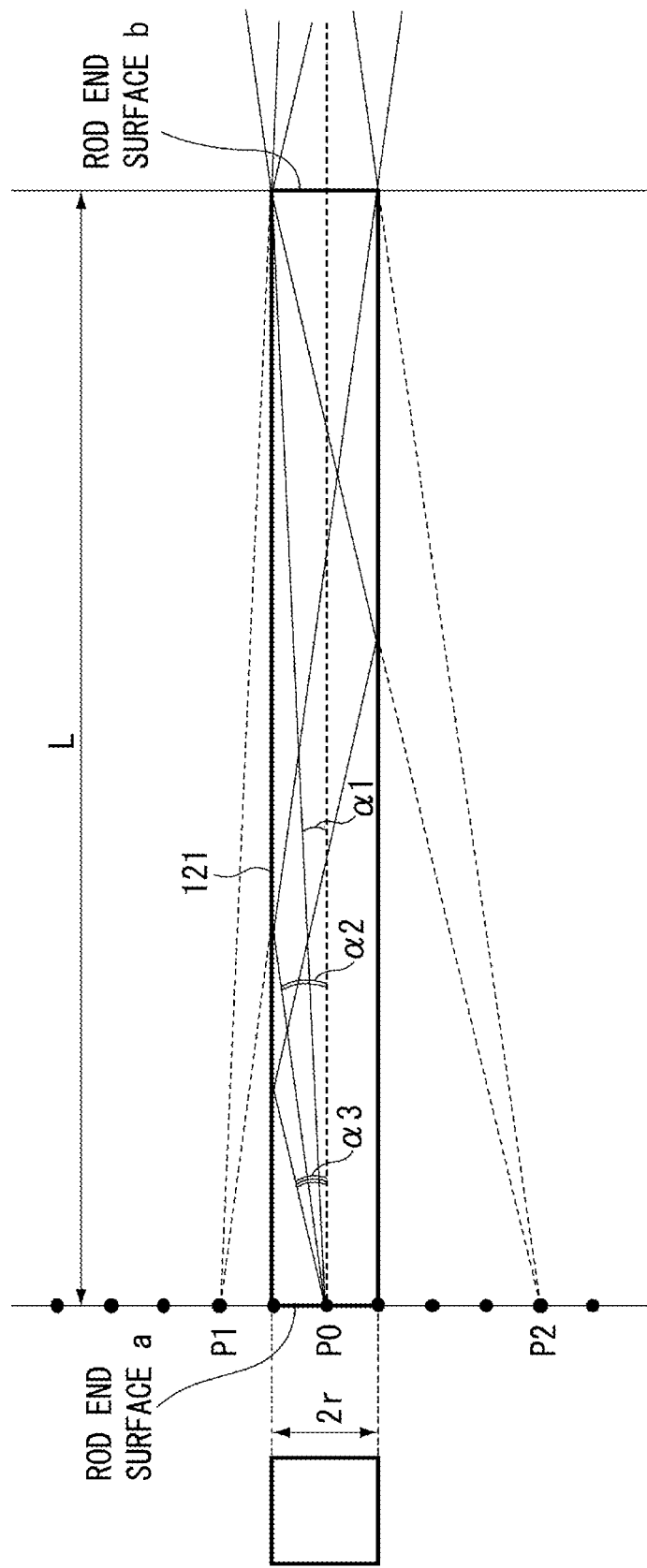
FIG. 5 illustrates integration effect achieved by an optical rod.

Optical rods are known to provide uniform illumination areas. FIG. 5 illustrates outline of the mechanism. In FIG. 5, an optical rod 121 has a length of L and its end is a square $2r$ on a side. Assume that a light beam enters the rod end face "a" at the central point P0 at an angle.

When the light beam enters the rod end face "a" at an angle of $\alpha$ relative to an optical axis, and travels through the rod at an angle of $\alpha'$ relative to the optical axis, there is a relationship between the angles $\alpha$ and $\alpha'$: $\sin \alpha = n \sin \alpha'$ (where the refraction index of the light beam is 1 in the air, and n in the rod). Considering the light beam angle $\alpha'$, when $0 \leq \alpha' < \alpha 1$, the light beam reaches a rod end face "b", which is opposite the rod end face "a", without impingement on the rod side face. When seen from the rod end face "b", the light beam seems as if it was emitted only from the point P0.

When $\alpha' \geq \alpha 1$, the light beam impinges on the rod side face, and is totally reflected. When the light beam angle $\alpha'$ is $\alpha 1 \leq \alpha' < \alpha 2$, the light beam is once totally reflected by the rod side face, and seems as if it was emitted from the point P1 as seen from the rod end face b. In other words, the light beam seems as if it was emitted from a point other than the point P0 to illuminate the rod end face "b". When the light beam angle $\alpha'$ is $\alpha 2 \leq \alpha' < \alpha 3$, the light beam is totally reflected by the rod side face twice, and seems as if it was emitted from a point P2 as seen from the rod end face "b". In other words, the light beam seems as if it was emitted from a point other than the points P0 and P1 to illuminate the rod end face "b".

The increase in the number of reflections of a light beam in a rod increases the number of virtual images that illuminate the rod end face "b", and thereby increasing the number of illumination points. Accordingly, the increase in the number of reflections in a rod results in increase in uniformity of illuminance on the rod end face "b". Qualitatively, a larger angle $\alpha'$, a smaller size r, and a larger length L increase the number of reflections. Any member other than a glass rod illustrated in FIG. 5 may be used if the member provides uniform illuminance at its exit face through reflection of light beams at its inner face. For example, a hollow metal rod having a rectangular bore therein may be used: in the bore, light beams are reflected a plurality of times by mirror operation of the side face of the bore, and thereby the bore provides uniform illuminance at its exit face.

This is the mechanism of the optical rod 121 to provide uniform illuminance at its exit face by reflecting light at its inner face without leakage of the light.

Figure 6A:
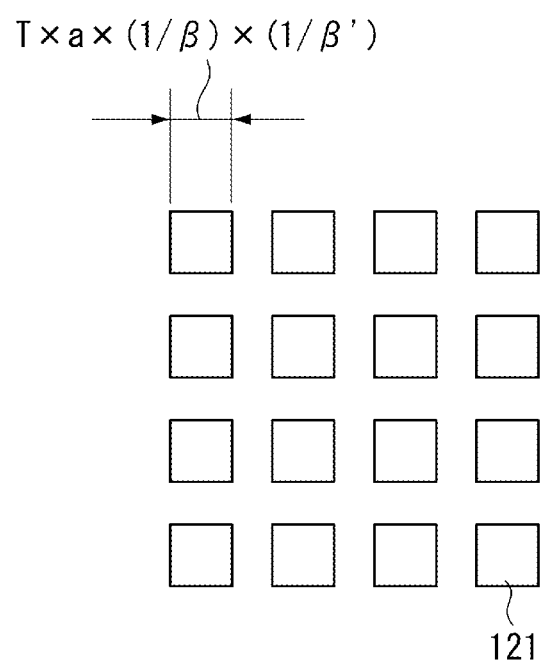
FIGS. 6A to 6C each illustrate illumination and image formation at an optical integrator unit, a sample unit, and an imaging unit.

In FIG. 1, the optical integrator unit 120 guides light fluxes emitted from the light source unit 110 without leakage to provide uniform illuminance at the exit face of each of the optical rods 121. When the optical integrator unit 120 has a plane A as the exit face, the plane A, as illustrated in FIG. 6A, has a discrete and uniform distribution of illumination areas thereover corresponding to the plurality of optical rods 121. An image of the plane A is formed by the conjugate optical system 130 to illuminate the target B as a sample plane. In the conjugate optical system 130, as long as uniform illuminance for imaging is provided at the target B, the plane A is not necessarily disposed at a position completely conjugate with the target B, and may be disposed at a position approximately conjugate with the target B.

Figure 2A:
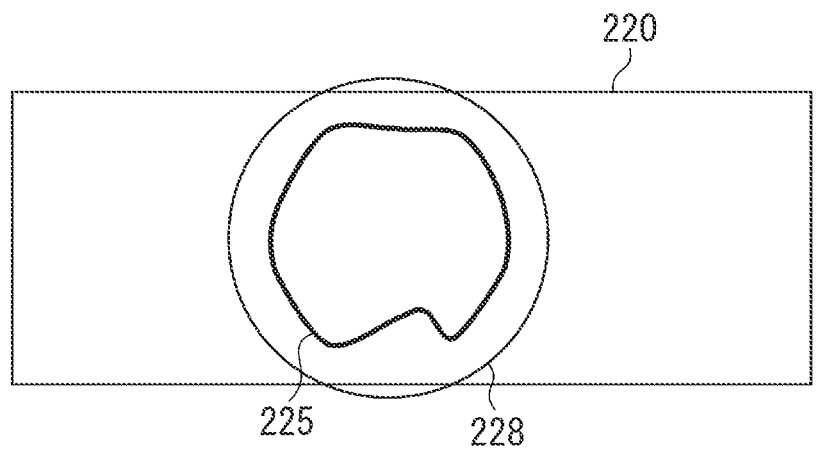
FIGS. 2A and 2B each illustrate an illumination state when an area is illuminated symmetrically along an optical axis.
Figure 6B:
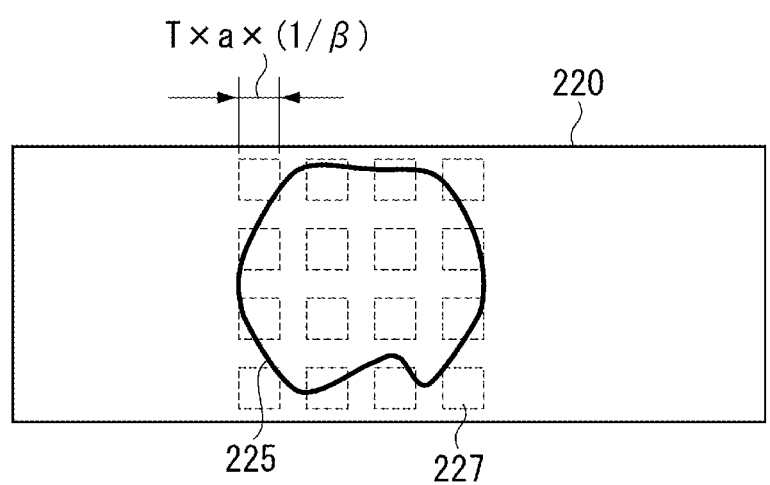

The sample unit 200 includes a sample stage 210 and a sample holding unit 220. The sample stage 210 is able to move the sample holding unit 220 in the direction of an optical axis, the direction orthogonal to the optical axis, and the direction at an angle relative to the optical axis. The sample holding unit 220 includes a glass slide, a sample 225 (FIG. 6B), and a glass cover (not illustrated), and holds the sample 225 at the position corresponding to the target B. The sample 225 is not illuminated symmetrically along the optical axis as illustrated in FIG. 2A, but discretely as illustrated in FIG. 6B corresponding to the illumination areas 227. Each illumination area 227 has uniform illuminance.

The imaging optical system 300 forms an image of the sample illuminated at the target B on an imaging plane C at a wide angle of field and at high resolution. An image of the sample 225 to be observed is formed as an image 225C as illustrated by the dashed line in FIG. 6C on the imaging plane C by the imaging optical system 300.

Figure 6C:
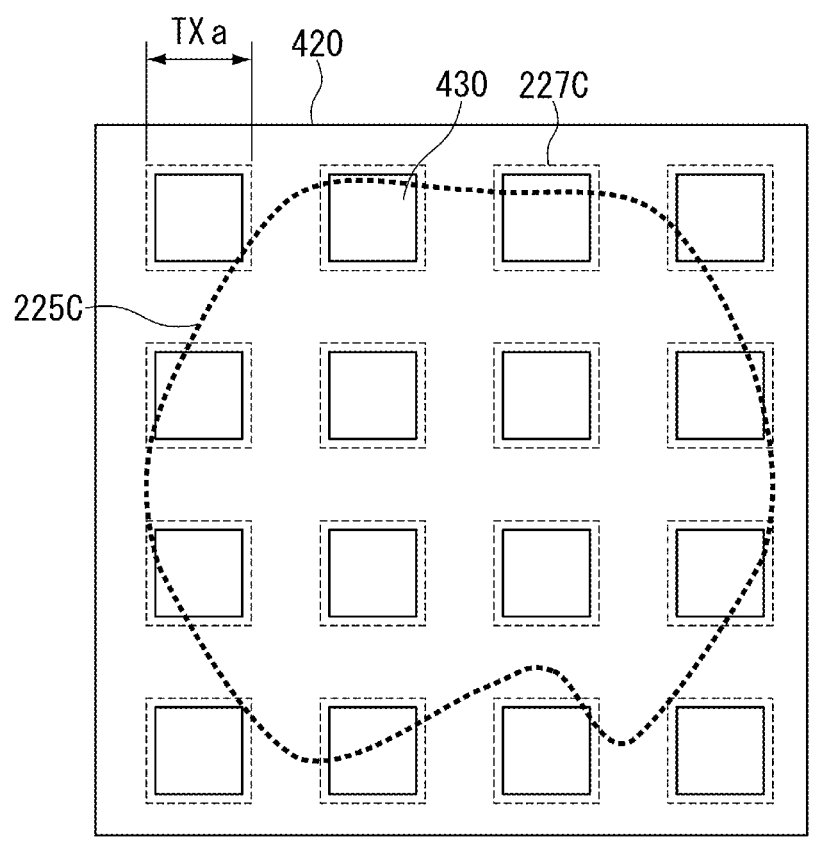

An imaging unit 400 includes an imaging stage 410, an electric substrate 420, and image sensors 430. The image sensors 430 are, as illustrated in FIG. 6C, arranged with spaces therebetween on the electric substrate 420, and are disposed on the imaging stage 410 at the position corresponding to the image-forming surface C of the imaging optical system 300. On the imaging plane C, each of the areas 227C illuminating the sample has the same size as that of each of the image sensors 430. As illustrated in FIG. 6C, a first optical rod (first integrator) illustrates a first image sensor, and a second optical rod (second integrator) illustrates a second image sensor other than the first image sensor illuminated by the first optical rod (first integrator).

Figure 2B:
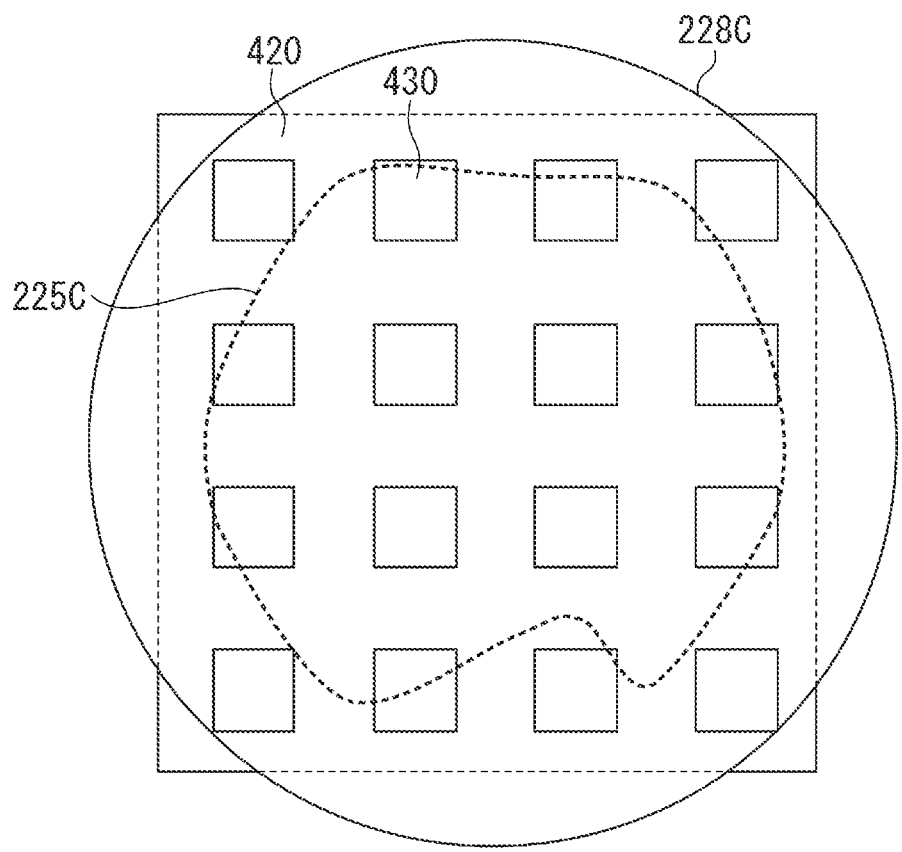

When the imaging optical system 300 has a magnification $\beta$, the conjugate optical system 130 has a magnification $\beta'$, and the image sensors 430 each have a size $\Box$T, the rod end face has a surface area expressed by: $\Box T \times (1/\beta) \times (1/\beta')$. The rod end face may have a little margin so that the formed sample image may have a size of $\Box T \times a$ (mm) (where a>1) at each image sensor 430. In this case, the rod end face has a surface area expressed by: $\Box T \times a \times (1/\beta) \times (1/\beta')$, as illustrated in FIG. 6A. As a result, on the imaging plane C, the amount of light illuminating areas where the image sensors 430 is not arranged is reduced as compared to the case in FIG. 2B, and an image of the light from the sample object is formed on the areas where the image sensors 430 is arranged as illustrated in FIG. 6C.

In the imaging apparatus according to the present invention, images of an object to be imaged displaced on the target are captured a plurality of times by displacing at least one of the optical integrator exit surface A, the target B, and the imaging plane C relative to each other in the plane orthogonal to the optical axis.

Figure 7A:
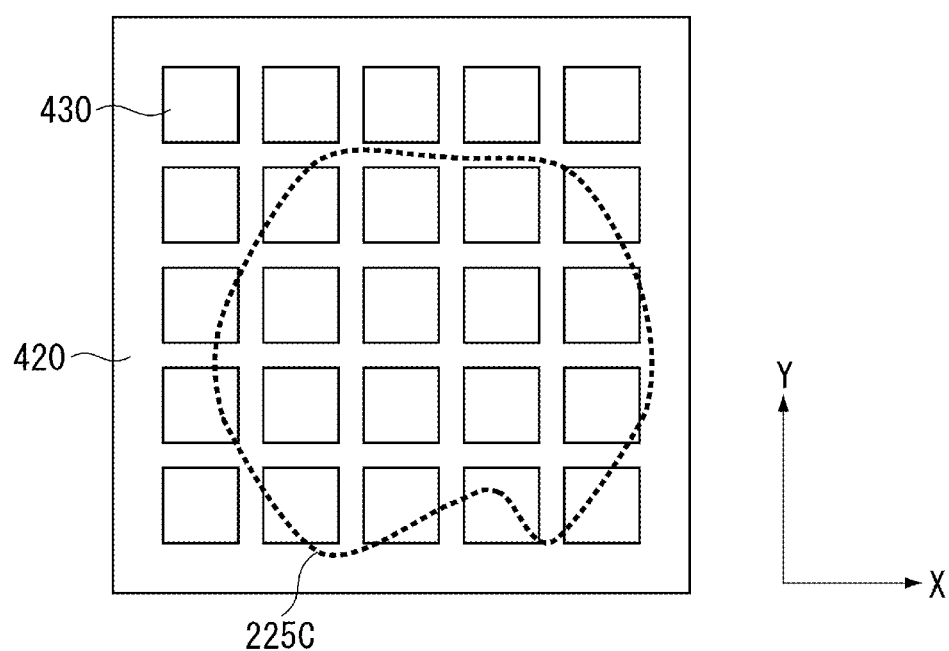
FIGS. 7A to 7F illustrate how an image of an entire sample is acquired through a plurality of times of image capturing.
Figure 7B:
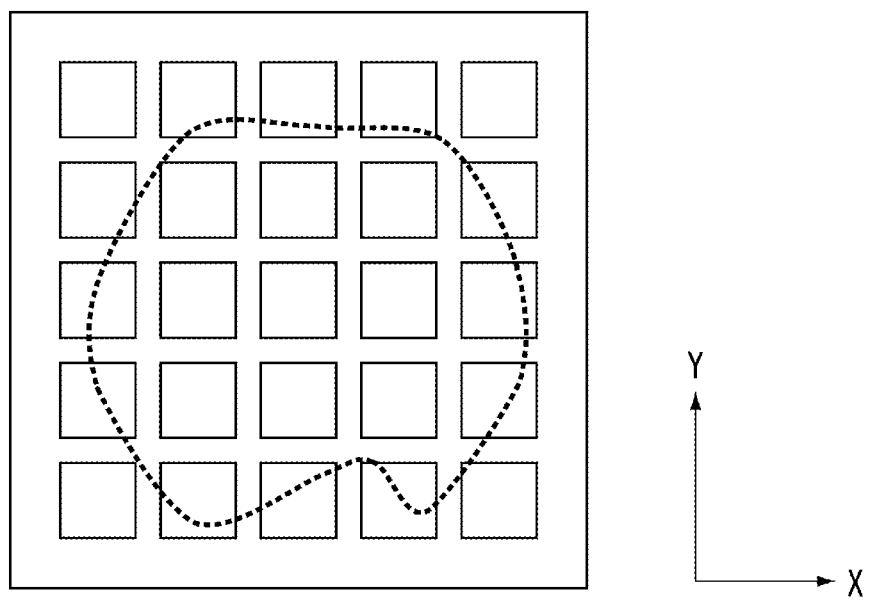
Figure 7C:
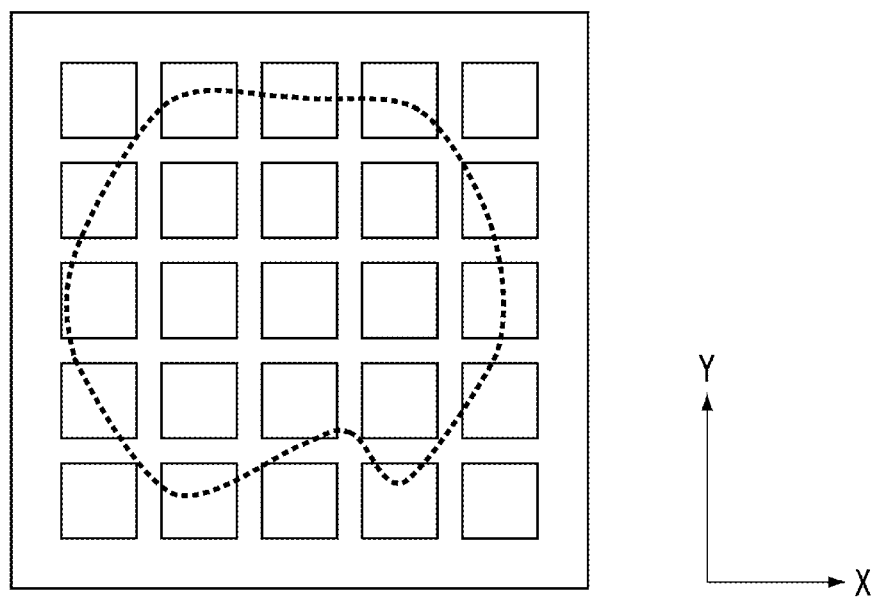

FIGS. 7A to 7F illustrate a case where a plurality of image sensors 430 are arranged in a grid and the sample holding unit 220 is displaced in an oblique direction, so that an image is captured at every displacement and the captured images are combined. FIGS. 7A to 7C illustrate the relationship between the image sensors 430 in the imaging unit 400 and the image 225C of the sample 225 when the sample holding unit 220 is displaced by half of the usable dimension of each image sensor 430 in the direction orthogonal to the optical axis (i.e., in the XY direction).

Figure 7D:
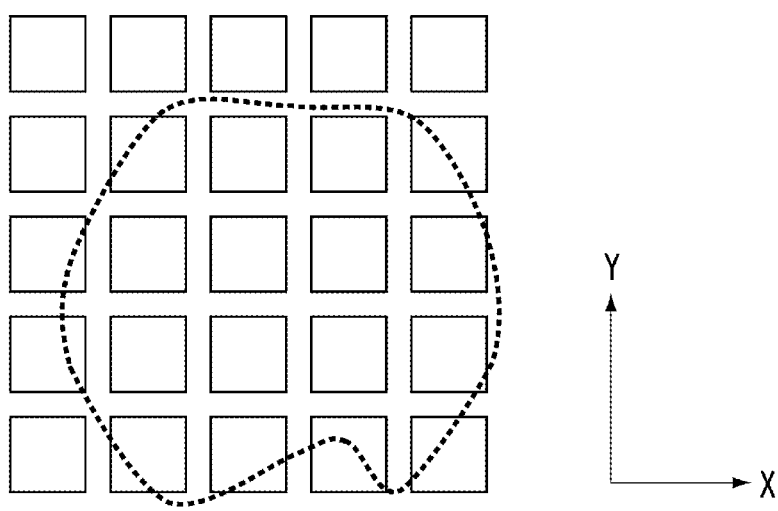
Figure 7E:
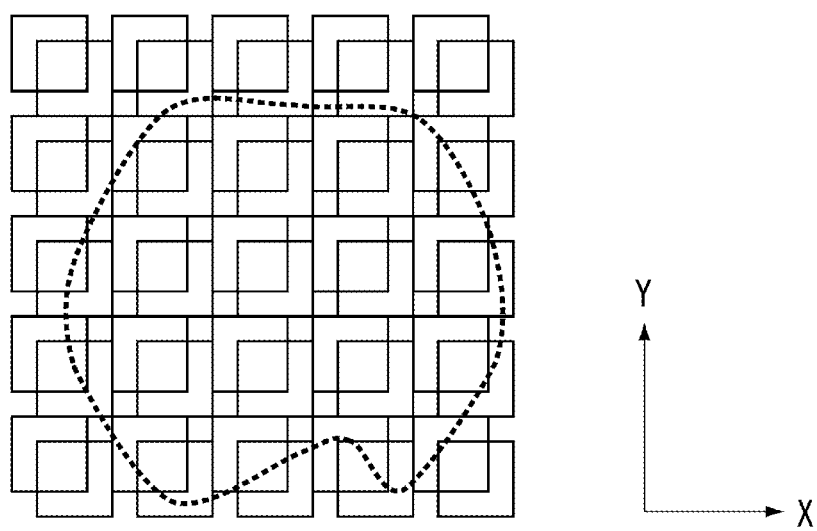
Figure 7F:
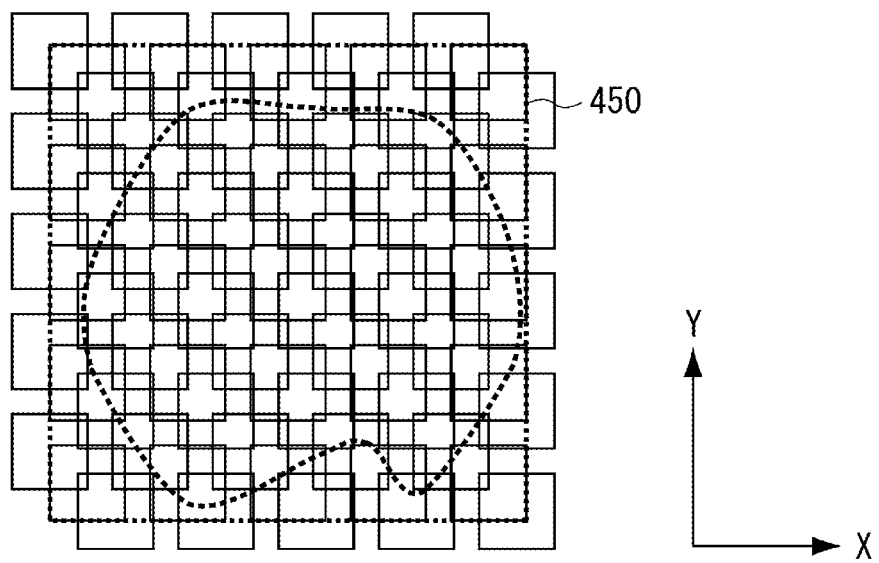

An image of the sample 225 is captured by the image sensors 430 at the position illustrated in FIG. 7A first. The image 225C of the sample 225 are imaged only in the discrete areas where the image sensors 430 are arranged as illustrated in FIG. 7D. Then, the sample holding unit 220 is displaced such that the sample 225 is disposed to the position illustrated in FIG. 7B to capture a second image of the sample 225. The resultant second image is combined with the first image, providing an image of the areas illustrated in FIG. 7E. Finally, the sample holding unit 220 is further displaced such that the sample 225 is disposed to the position illustrated in FIG. 7C to capture a third image of the sample 225. The resultant third image is combined with the first and second images, providing an image of the areas illustrated in FIG. 7F that corresponds to the entire area to be captured.

Figure 8A:
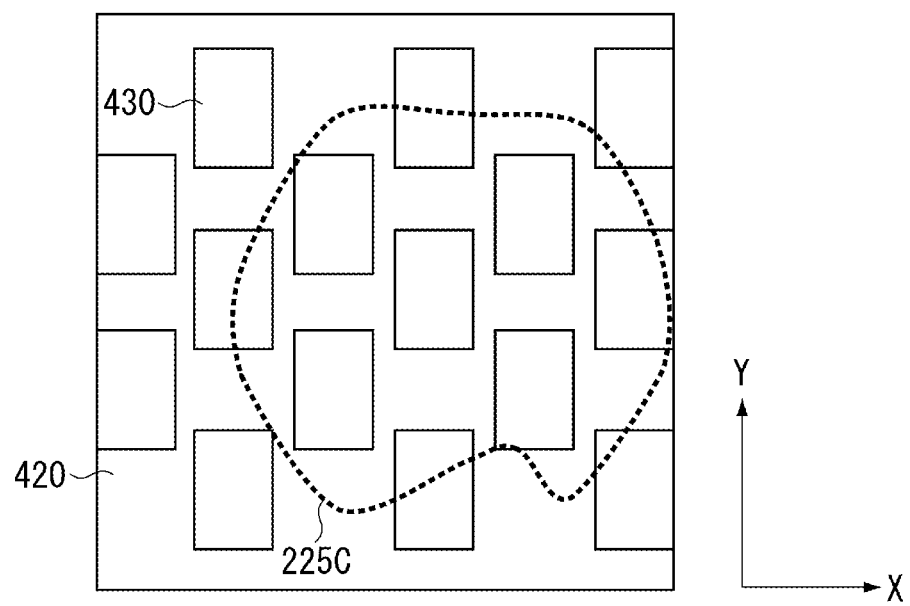
FIGS. 8A to 8F illustrate how an image of an entire sample is acquired through a plurality of times of image capturing.
Figure 8B:
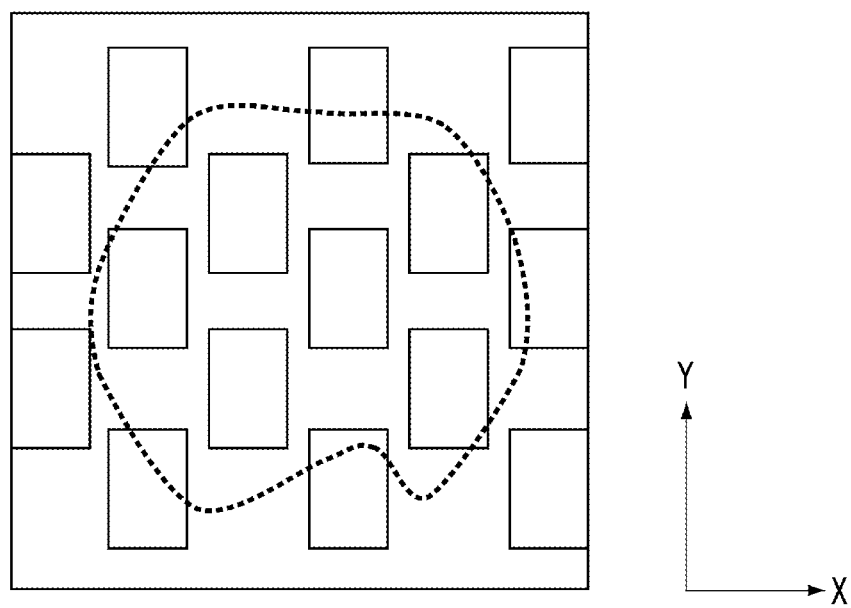
Figure 8C:
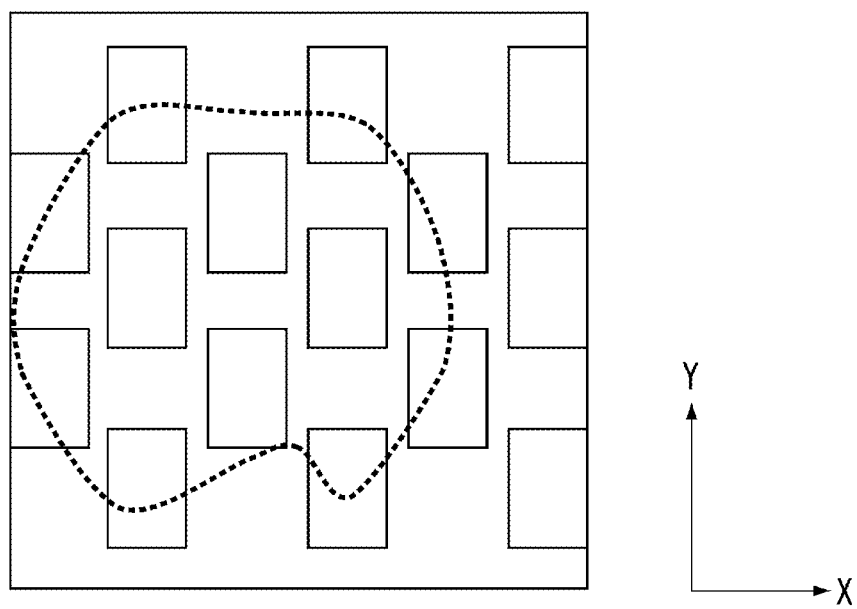

In the present exemplary embodiment, as illustrated in FIGS. 8A to 8C, the plurality of image sensors 430 may be arranged in zigzag. In this case, the sample holding unit 220 is displaced in the X direction, by a usable dimension of the image sensors 430 in the X direction at one time, so that an image is captured at every displacement and the captured images are combined.

The image sensors 430 are arranged such that the areas corresponding to the image sensors 430 are superimposed with one another to enable combination of images when the sample holding unit 220 is displaced in the X direction repeatedly to capture images. In addition, in the case illustrated in FIGS. 8A to 8F, corresponding to the image sensors 430 each having a rectangular shape, the exit face of each optical rod 121 is configured to have a rectangular shape similar to that of the image sensor. By causing the shape of the exit face of each optical rod 121 to correspond to the shape of each image sensor 430 leads to reduction in the amount of light illuminating the area outside of the image sensors 430 and effective use of the light receiving areas. The term "correspond" used herein means that, for example, when an image sensor has a rectangular or hexagonal shape, correspondingly the exit face of each optical rod has a rectangular or hexagonal shape. The similarity or likeness between the shape of an image sensor and that of the exit face of each optical rod enables more effective use of the light receiving areas of the image sensors.

Figure 9A:
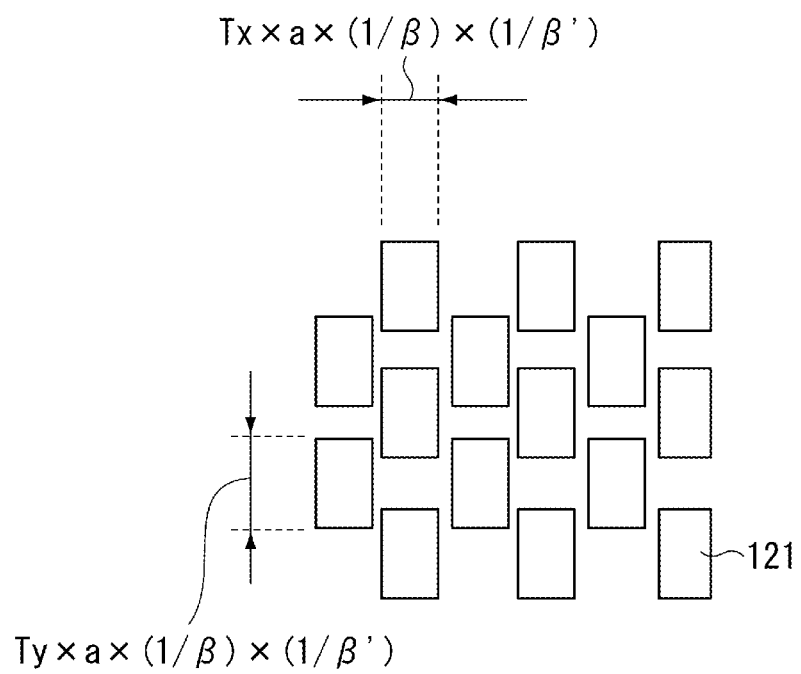
FIGS. 9A to 9C each illustrate illumination and image formation at an optical integrator unit, a sample unit, and an imaging unit.
Figure 9B:
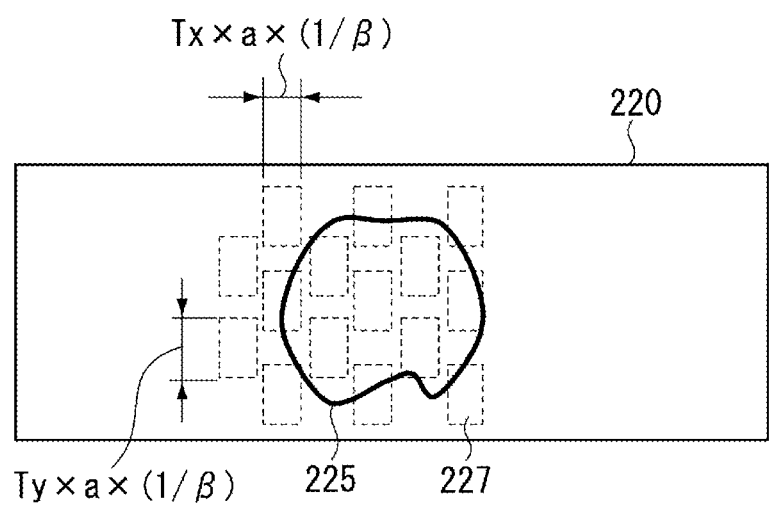
Figure 9C:
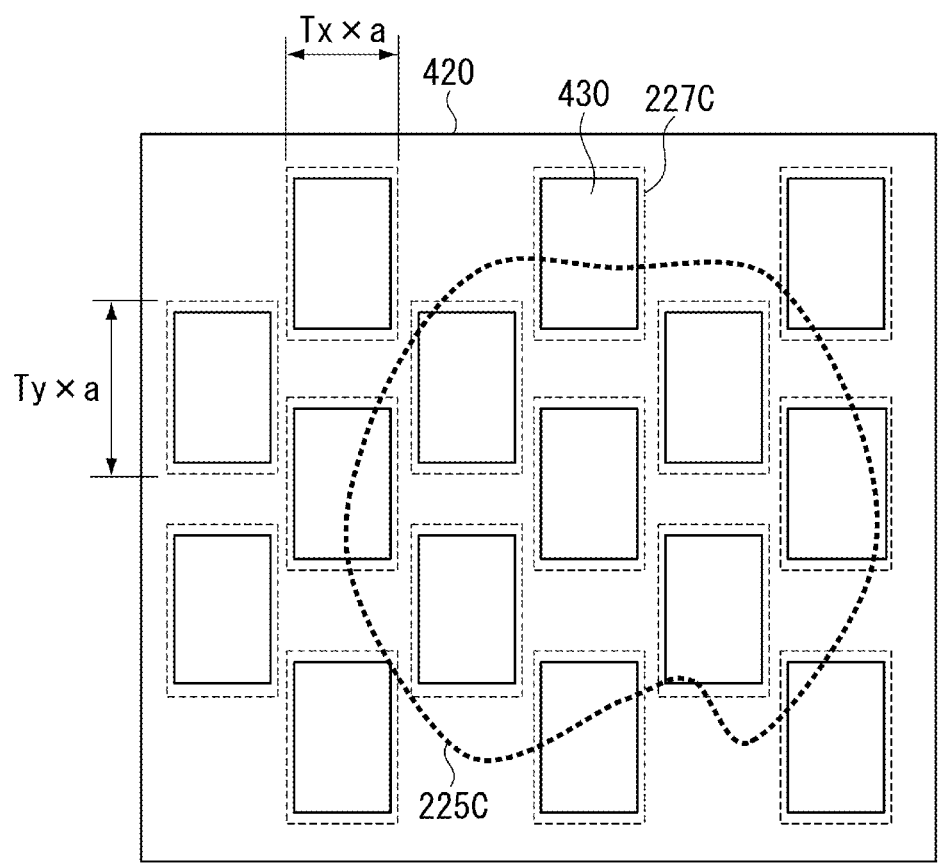

FIG. 9A to 9C illustrate a plane A as an exit face of an optical integrator, a target B, and illumination on an imaging plane in the case described above. In this case also, the imaging optical system 300 has a magnification $\beta$, and the conjugate optical system 130 has a magnification $\beta'$. When the image sensors 430 each have a size Tx in the X direction and a size Ty in the Y direction, the rod end face has a length expressed by: $Tx \times (1/\beta) \times (1/\beta')$ in the X direction and a length expressed by: $Ty \times (1/\beta) \times (1/\beta')$ in the Y direction.

Figure 8D:
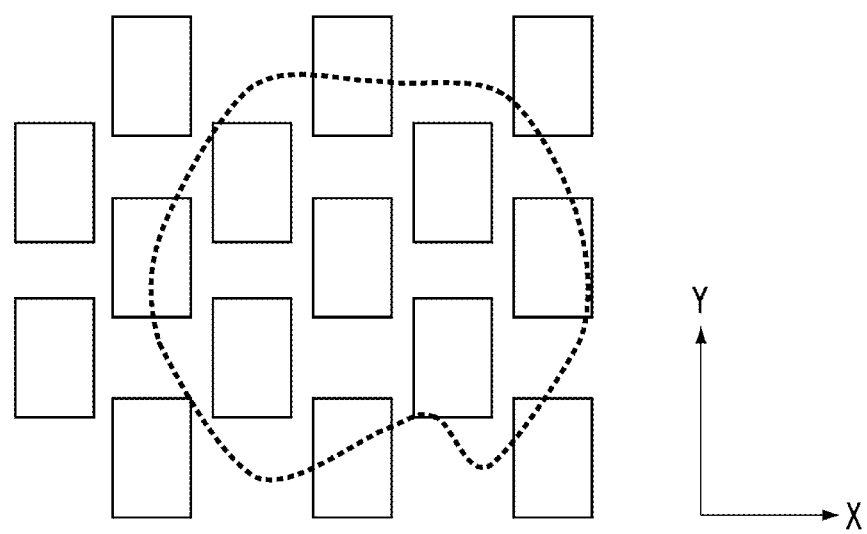
Figure 8E:
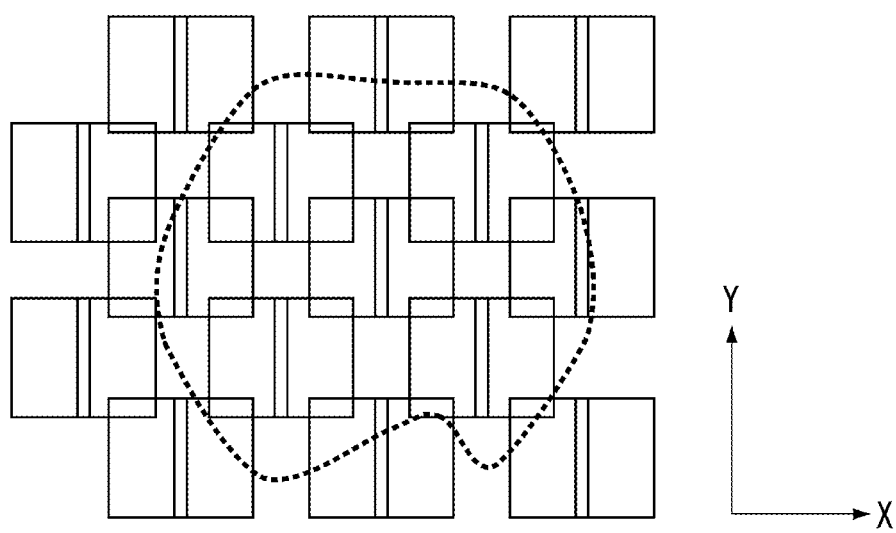
Figure 8F:
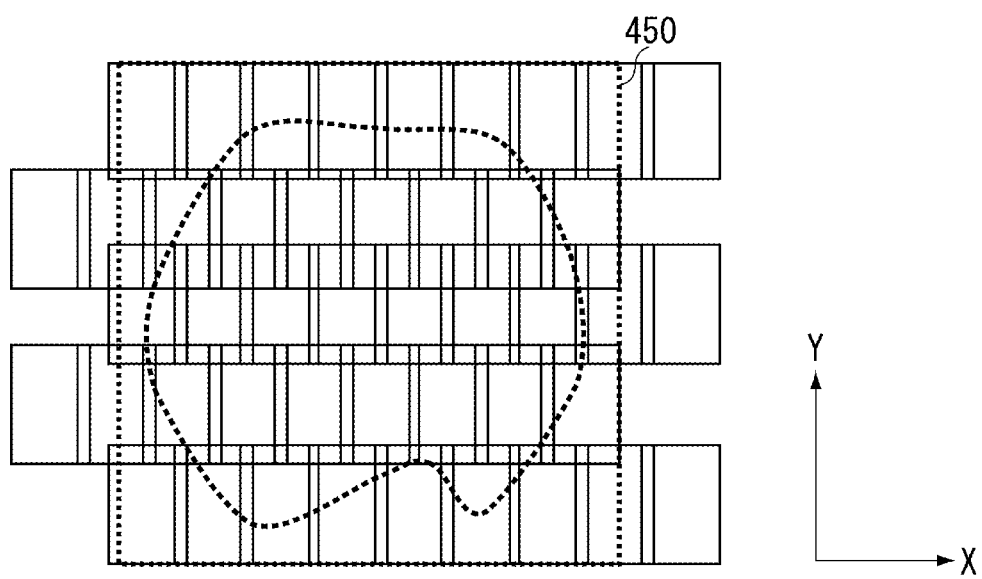

When an image of the sample 225 is captured by the image sensors 430 at the position illustrated in FIG. 8A first, the image 225C of the sample 225 is imaged only in the discrete areas where the image sensors 430 are arranged as illustrated in FIG. 8D.

Then, the sample holding unit 220 is displaced such that the sample 225 is disposed to the position illustrated in FIG. 8B to capture a second image of the sample 225. The resultant second image is combined with the first image, providing an image of the areas illustrated in FIG. 8E.

Finally, the sample holding unit 220 is further displaced such that the sample 225 is disposed to the position illustrated in FIG. 8C to capture a third image of the sample 225. The resultant third image is combined with the first and second images, providing an image of the areas illustrated in FIG. 8F that corresponds to the entire area to be captured.

As described above, a plurality of image data is combined using an image processing unit 510, and the combined image is stored in a recording unit 530 and displayed on an image displaying unit 520.

According to the present exemplary embodiment, each light flux exits from a plurality of optical integrators illuminates each image sensor. In other words, each light flux exits from a plurality of optical integrators illuminates each conjugate image of the image sensors that are obtained through the imaging optical system. This structure enables image formation of a sample on the areas where the image sensors are arranged. In other words, the amount of light illuminating the areas, which are not related with imaging, other than the image sensors, can be reduced, so that undesirable light for imaging such as flare is prevented, and degradation of image quality is reduced.

In addition, the adverse effect of reflection and absorbance of light at the electric substrate for example in the imaging unit can be reduced, which increases degree of freedom in arrangement of electric wiring and machine units. Technically, the illumination areas may be blurred due to aberration or defocus occurring in the conjugate optical system 130 or the imaging optical system 300, and thereby light fluxes may illuminate areas other than the image sensors. However, as long as the illuminance of an illumination area affected by the blur or overlap of the blur distribution is set to remain lower than that on the image sensors, the light can be effectively used and degradation of image quality due to scattering light can be reduced, as compared with the case where a sample is entirely illuminated at one time.

Furthermore, the only required areas are illuminated, so that the use efficiency of the light source may be improved. The light sources may be affected by temperature, which changes the wavelength and/or amount of luminescence from the light sources. However, the improved use efficiency of the light sources contributes to the reduction in degradation of image quality related to variations in the properties of the light sources.

Figure 10:
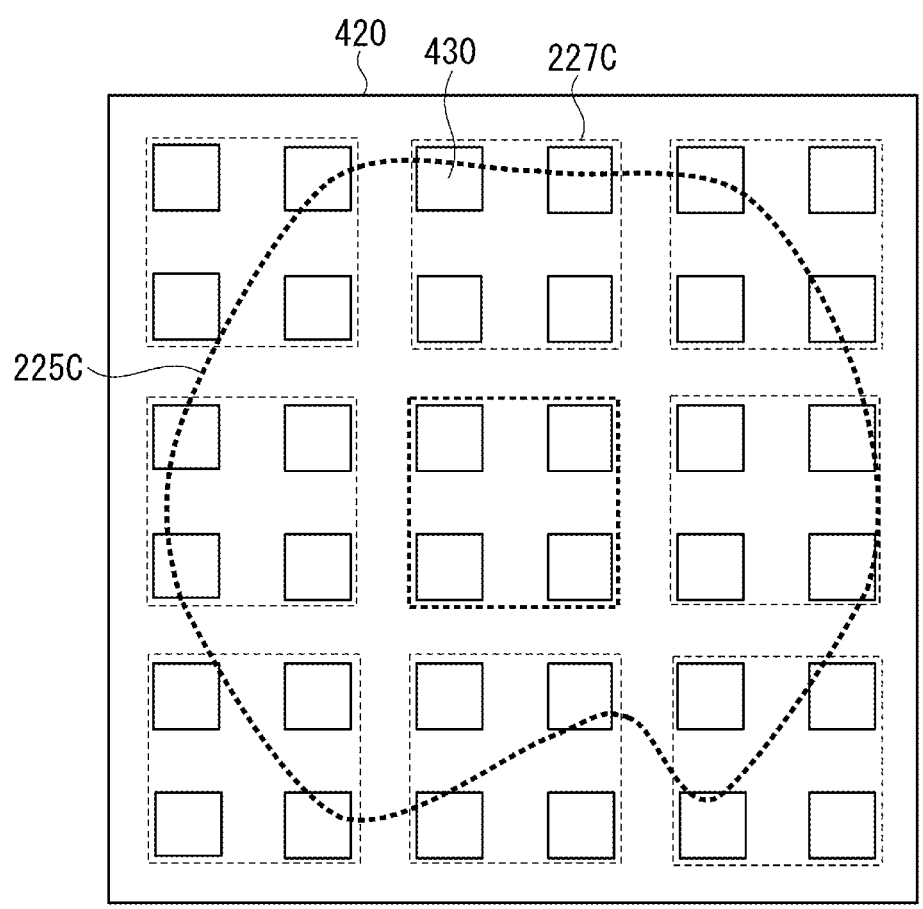
FIG. 10 illustrates the relationship between an illumination unit and image sensors in an imaging unit.

A second exemplary embodiment is described. When there are limits, such as the magnification β of the imaging optical system, the magnification β', of the conjugate optical system, and the areas to be imaged, to the design of the imaging apparatus, sometimes the rods are difficult to correspond to the image sensors unlike in the first exemplary embodiment. In this case, one rod may correspond to a plurality of image sensors. For example, as illustrated in FIG. 10, one rod may illuminate four image sensors to uniformly illuminate the area containing the four image sensors. This configuration also can reduce adverse effect on image quality, not so much as in the first exemplary embodiment, but more as compared with the conventional configuration in which the entire area where all the image sensors capture the image is illuminated.

Figure 11:
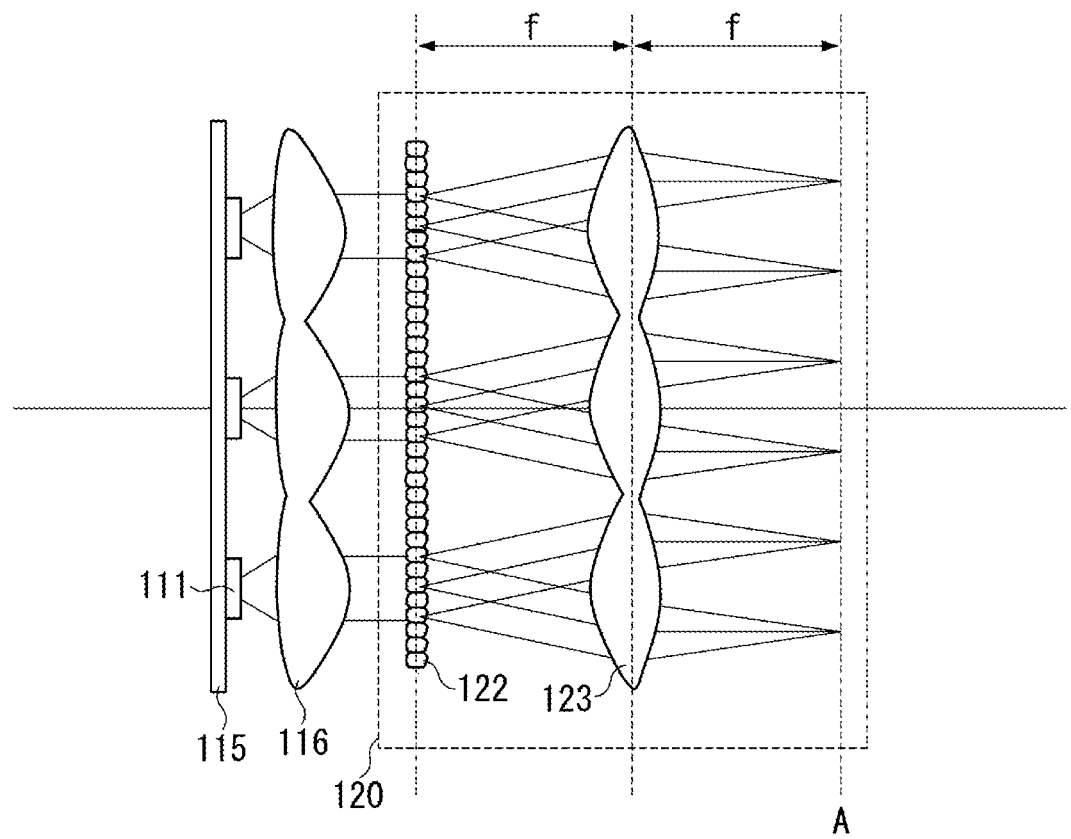
FIG. 11 illustrates an optical integrator unit.

A third exemplary embodiment is described. In the first and second exemplary embodiments, the optical integrator unit 120 is composed of optical rods, but a lens array may be used in place of the rods. FIG. 11 illustrates an optical integrator unit including a lens array.

The optical integrator unit in FIG. 11 includes a plurality of light sources 111. Each of the light sources 111 emits a light beam, and the light beam is collimated by each of collimating lenses 116, is collected or scattered by a lens array 122 composed of micro lenses, and passes through each of collimating lenses 123 to illuminate a plane A that corresponds to an optical rod exit face.

Figure 12:
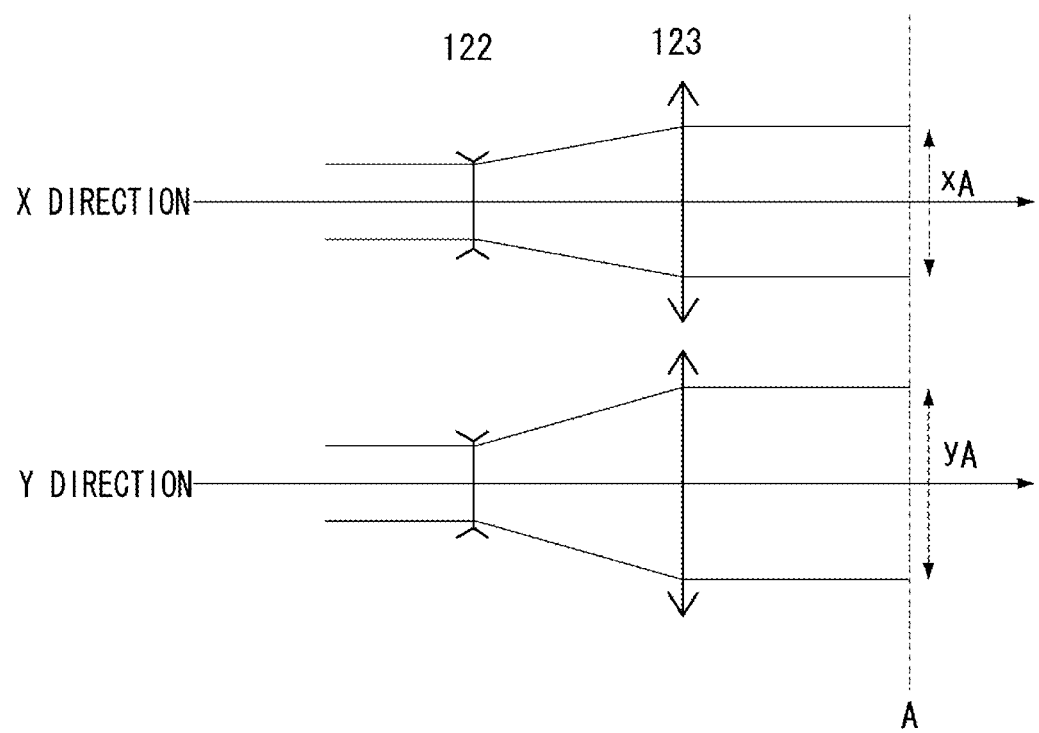
FIG. 12 illustrates an optical integrator unit.
Figure 13A:
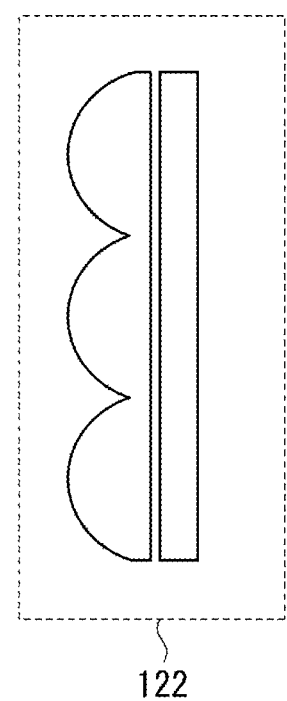
FIGS. 13A and 13B each illustrate an optical integrator unit.
Figure 13B:
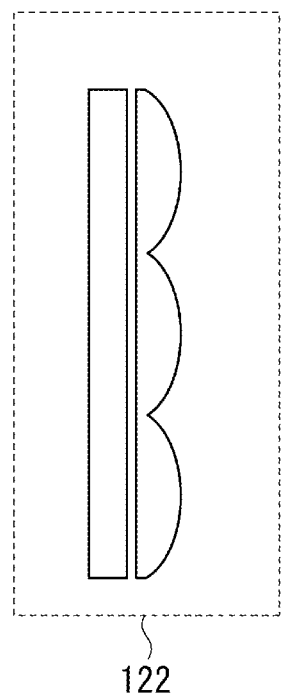

The lens array 122 is composed of a plurality of rectangular lenses that is connected to one another and each have a toroidal surface, the surface having a curvature in the X direction different from that in the Y direction. Each lens of the lens array 122 is not circular but is rectangular as illustrated in FIG. 12, and has different curvatures in the two directions to change the sizes of its illumination area in the x direction (xA) and that in the y direction (yA) to shape the light passing therethrough according to the size of an image sensor to be illuminated. Alternatively, the lens array 122 may be composed of cylindrical lenses as illustrated in FIG. 13, the lenses each being provided with one cylindrical surface having a curvature only in one direction and the other flat surface. In this case, when seen in the x direction, it is considered that each of the cylindrical lenses has a face having a curvature in the x direction, and the other has a flat face as illustrated in FIG. 13A. Whereas, when seen in the y direction, it is considered that each of the cylindrical lenses has a flat face and the other has a face having a curvature in the y direction as illustrated in FIG. 13B.

In FIG. 11, the lens array 122 is disposed at a distance of a focal length f from the collimating lenses 123, and the collimating lenses 123 are disposed at a distance of the focal length f from the plane A to be illuminated. The light fluxes passing through the plurality of lenses of the lens array 122 enters the each lens of the collimating lens group 123 (illustrated in FIG. 11 as light beams), and are superimposed to one another on the plane A to form uniform illumination (by Kohler illumination system). In this case, illumination areas uniformly illuminated by a Kohler illumination system are discretely formed on the plane A corresponding to each light source.

Aerial images are formed on the plane A. Thus, the conjugate optical system may be eliminated to combine the plane A with the target B, or the conjugate optical system may be used as a variable magnification optical system depending on design conditions. Such configurations form discrete and uniform illumination areas according to the size and arrangement of image sensors which are arranged discretely as illustrated in FIG. 6C. As a result, the amount of light illuminating the areas other than the image sensor unit can be reduced, preventing flare and degradation of image quality.

A fourth exemplary embodiment is described. As described above, uniform illuminance is important to obtain images of high quality through equal imaging conditions at every image sensor.

The imaging conditions are influenced, at each image sensor that receives an image, by variations in illuminance, variations in image sensor property, variations in transmittance of optical systems. Accordingly, depending on the required image quality, the variations need to be accurately corrected. The variations can be corrected as follows.

The variations in illuminance, transmittance, and image sensor property can be corrected by regulating the light from an object (i.e., the sample 225) to be formed as an image on each image sensor in the same condition. Thus, before imaging, the target B is illuminated in advance in a state where nothing placed on the target B or a glass plate with no sample is inserted thereon. If there is no variation in the image sensors, an image is captured in which each image sensors are illuminated by the same illuminance. In contrast, any variation in the image sensors will result in detection of difference between each image of the image sensors.

When the difference is detected, the difference is calibrated and corrected with software, through change in gain for example, for every image sensor, so that the difference is corrected in a next imaging. Alternatively, the imaging result with the difference may be fed back to the amount of light emitted from the light source to control the light source by a control unit 510 (illustrated in FIG. 1) to calibrate the amount of light. The amount of light from the light source can be controlled by controlling the amount of current flowing through LEDs that can be switched rapidly, or by rapidly turning on/off the LEDs to change the ratio of the current flowing through LEDs.

After the calibration, imaging of the sample is performed. This preparation enables illumination by uniform illuminance at each of the discrete illumination units, leading to improvement of image quality.

Figure 14:
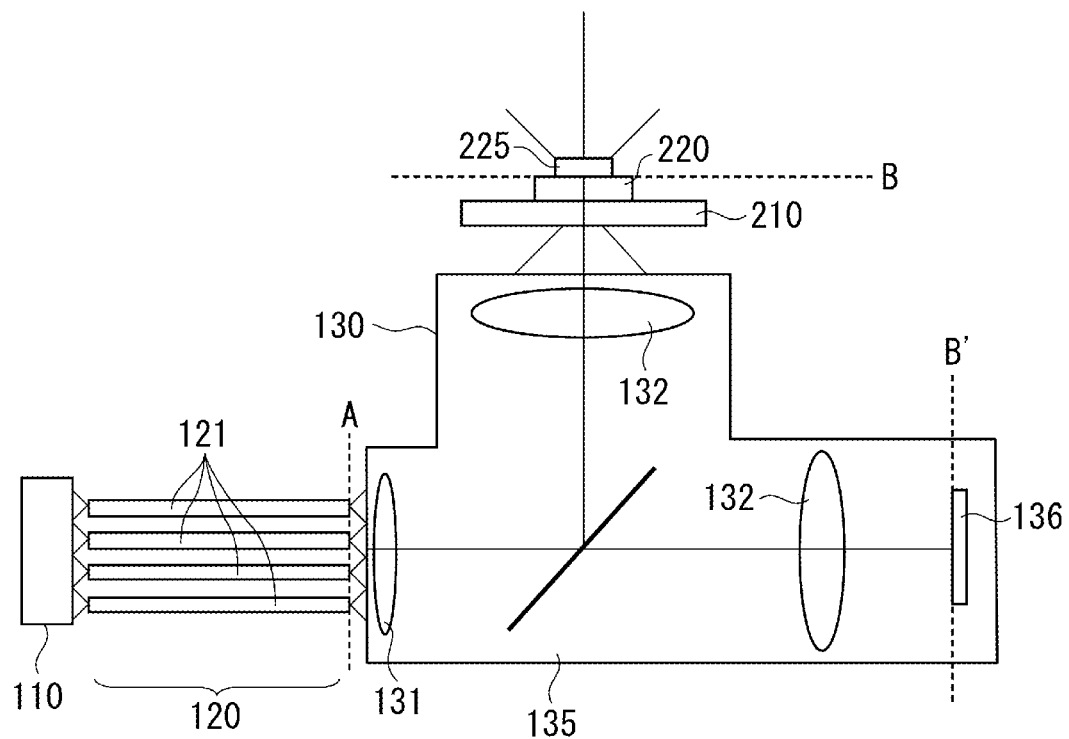
FIG. 14 illustrates a light source unit.

The above variations may be corrected using a measured result by a light measuring apparatus prepared separately. For example, as illustrated in FIG. 14, a half mirror 135 is used in the conjugate optical system 130 to pass part of a light flux, which is measured by at least one light amount monitor 136 disposed at a plane B' that is equivalent of the sample unit B. A plurality of monitors is arranged to correspond to respective rods, or a large image sensor is arranged as the light amount monitor 136. In the case where the large image sensor is arranged, the monitor 136 is divided into each illumination area so that the accumulated illuminance of each area is calculated as the illuminance of the image sensor. The conjugate optical system 130 contains a front lens group 131 and a rear lens group 132.

Figure 15A:
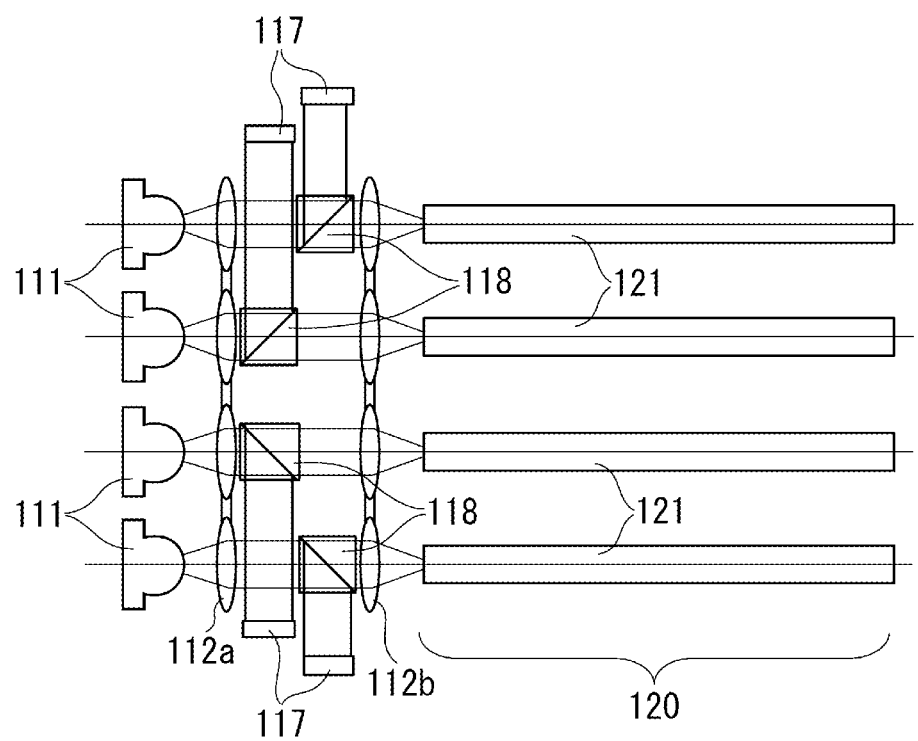
FIGS. 15A and 15B illustrate a light source unit and an optical integrator unit.
Figure 15B:
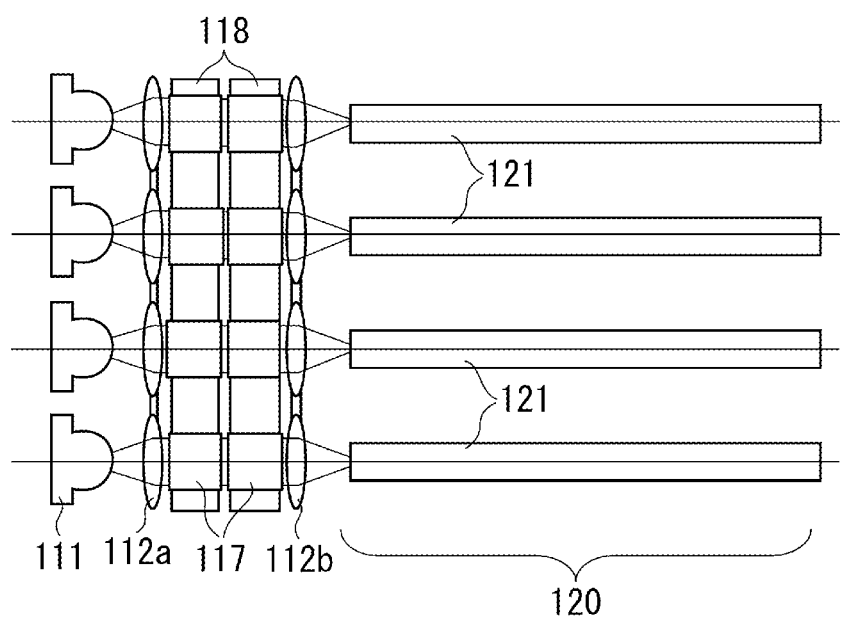

Alternatively, the amount of light before entering the rods may be measured. FIGS. 15A and 15B illustrate an optical system to collimate light beams from the light sources 111 by the lens array 112a and collect them by the lens array 112b. FIG. 15A is a side view and FIG. 15B is a top plan view of the system. Between the lens arrays 112a and 112b, half mirrors 118 are provided to split the light beams, so that the split light beams are measured by light measuring apparatuses 117. The measurement may be performed by the plurality of light measuring apparatuses 117 as illustrated in FIGS. 15A and 15B, or a large image sensor that is divided into illumination areas corresponding to each rod so that the illuminance of each area is calculated by accumulating the illuminance thereof.

In FIG. 14 and FIGS. 15A and 15B, rod integrators are used, but a lens array may be used when the amount of light is measured with half mirrors and light measuring apparatuses.

As described above, in a configuration with a plurality of rod integrators, a light beam need to be supplied to the end face of each rod. To eliminate frequent replacement of light sources, the light source unit may be configured to supply light beams to one rod from a plurality of light sources.

Figure 16A:
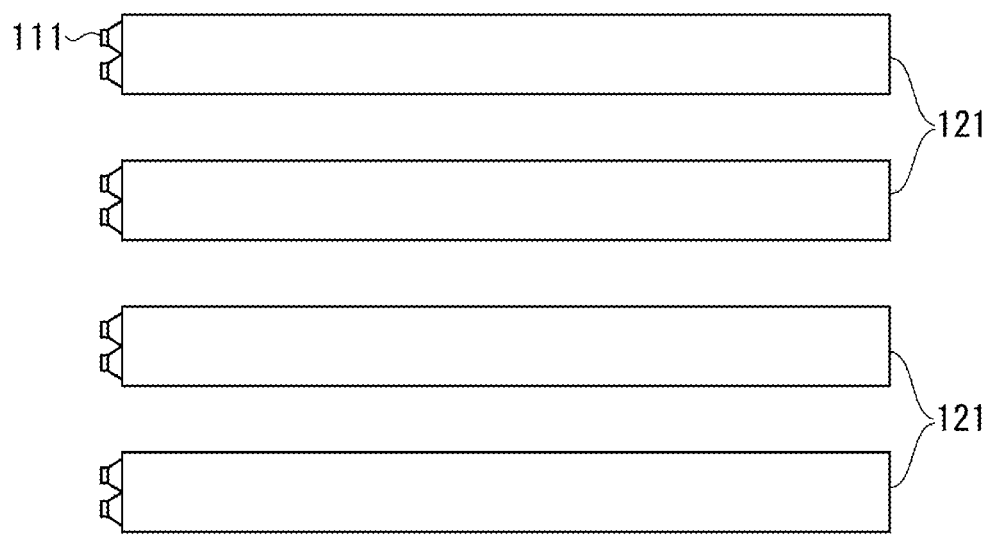
FIGS. 16A and 16B each illustrate a structure where light from a plurality of light sources enters one optical rod.
Figure 16B:
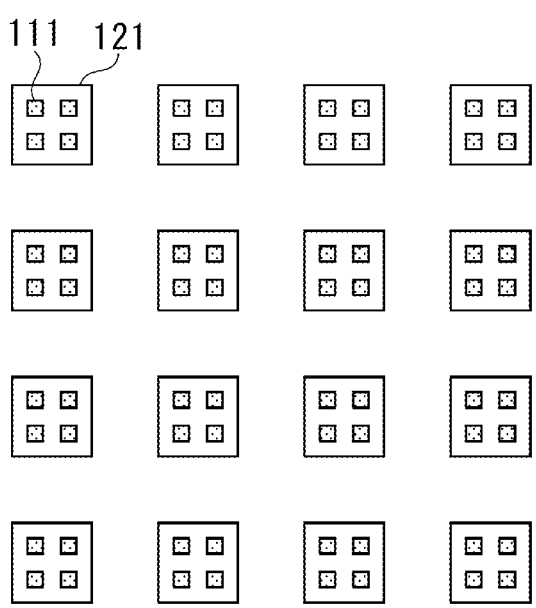

FIGS. 16A and 16B and FIG. 17 illustrate such a configuration. FIG. 16A is a side view illustrating a case where a plurality of light sources 111 emits light beams to one rod integrator 121. FIG. 16B is a front view illustrating a positional relationship between the light sources 111 and the rod integrators 121 as seen from the free end faces of the light sources 111. In FIGS. 16A and 16B, a group of light units (e.g., 16 sets in FIGS. 16A and 16B) each having a plurality of light sources (e.g., four in FIGS. 16A and 16B) is provided with substrates suitable to the arrangement of the rod integrators to supply light beams from the light sources to one rod integrator.

In this case, a plurality of small light sources is used instead of a large light source. This eliminates the necessity of a light source combining unit such as prisms, and the configuration does not require a cooling mechanism or require small one. Thus, this configuration reduces the frequency of replacement of light sources, and downsizes the light source unit.

FIG. 17 illustrates a configuration in which a light source unit 110 that is provided with a plurality of light source channels and each channel is able to adjust the amount of light. A plurality of fiber bundles 114 extends from the light source unit 110 to guide light to the rod integrators 121. In this exemplary example, the light source unit has a larger size than that of the above case due to the fiber bundles, but drawing of light line is facilitated, and thereby size increase of the entire apparatus can be prevented by arranging the light source unit appropriately on the imaging apparatus such that the fiber bundles can guide light to the rod integrators. The increase of amount of light by a plurality of light sources as described above also results in consistent image quality (prevention of degradation of image quality) because the variations in the amount of light caused by heats and individual property of the light sources do not have a larger effect than the case where the amount of light is increased by one light source.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-203158 filed Sep. 10, 2010 and No. 2011-136534 filed Jun. 20, 2011, which are hereby incorporated by reference herein in their entirety.

The invention claimed is:

1. An imaging apparatus, comprising:
   an illumination optical system that includes a light source and is configured to guide light from the light source to a target;
   an imaging optical system configured to form an image of the target; and
   a plurality of image sensors arranged on an image plane of the imaging optical system and configured to convert light from the imaging optical system into electrical signals,
   wherein the illumination optical system includes a plurality of integrators,
   wherein light exiting from one of the plurality of integrators illuminates at least one of the plurality of image sensors,
   wherein light exiting from the other integrators illuminates at least one of the plurality of image sensors other than the image sensor illuminated by the light exiting from the one of the plurality of integrators, and
   wherein the plurality of integrators is a plurality of rod integrators that performs inner reflection a plurality of times.

2. The imaging apparatus according to claim 1, wherein the plurality of rod integrators forms a plurality of discrete illumination areas.

3. The imaging apparatus according to claim 2, wherein light exiting from each exit surface of the rod integrators illuminates each of the plurality of image sensors, and
   wherein said each exit surface of the rod integrators has shape corresponding to each shape of the plurality of image sensors illuminated by the light exiting from said each exit surface.

4. The imaging apparatus according to claim 2, wherein the light source supplies light individually to a plurality of discrete illumination areas formed by the plurality of integrators.

5. The imaging apparatus according to claim 4, further comprising:
   a measuring unit configured to measure an amount of light entering the plurality of image sensors; and
   a control unit configured to control an amount of light entering each of the plurality of image sensors based on the measuring result obtained by the measuring unit.

6. The imaging apparatus according to claim 5, wherein the control unit controls such that variations in the amount of light entering each of the plurality of image sensors are reduced.

7. The imaging apparatus according to claim 5, wherein the measuring unit is composed of the image sensors.

8. The imaging apparatus according to claim 5, wherein the measuring unit is composed of a light measuring apparatus disposed in a plane conjugate with the target.

9. The imaging apparatus according to claim 2, wherein the shape of the exit surface of the rod integrators is rectangular.

10. The imaging apparatus according to claim 1, wherein the light exiting from the one of the plurality of integrators and the light exiting from the other integrators do not overlap each other on the image plane of the imaging optical system.

11. The imaging apparatus according to claim 10, wherein the light exiting from the one of the plurality of integrators and the light exiting from the other integrators discretely illuminate the image plane of the imaging optical system.

12. The imaging apparatus according to claim 1, wherein one image is obtained by capturing images of a object a plurality of times with changing relative position between the object disposed on the target to be imaged and the plurality of image sensors in a direction orthogonal to an optical axis.

13. An imaging apparatus, comprising:
   an illumination optical system that includes a light source and is configured to guide the light from the light source to a target;
   an imaging optical system configured to form an image of the target; and a plurality of image sensors arranged on an image plane of the imaging optical system and configured to convert light from the imaging optical system into electrical signals, wherein the illumination optical system includes a plurality of integrators to guide the light from the light source to at least one of the plurality of the imaging sensors, wherein the image plane of the imaging optical system includes an area between the plurality of imaging sensors which is not illuminated by the light exiting from the plurality of integrators, and wherein the plurality of integrators is a plurality of rod integrators that performs inner reflection a plurality of times.

* * * * *